United States Patent Office 3,427,804
Patented Feb. 18, 1969

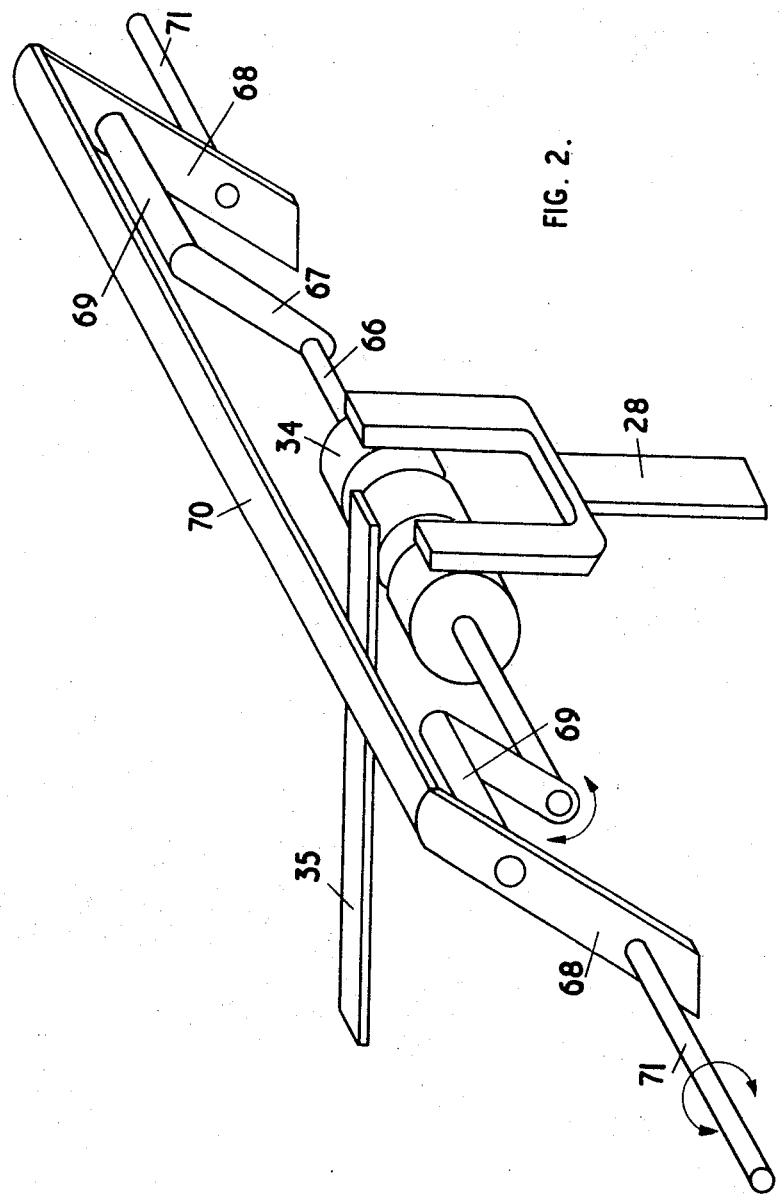

---

3,427,804
FUEL SYSTEMS FOR GAS TURBINE ENGINES
Owen Napier Lawrence, London, England, assignor to Joseph Lucas (Industries) Limited, Birmingham, England
Filed Mar. 17, 1967, Ser. No. 624,017
U.S. Cl. 60—39.28
Int. Cl. F02g 3/00; F02c 9/08; G05g 11/00
1 Claim

ABSTRACT OF THE DISCLOSURE

A gas turbine engine fuel system having a pump supplying fuel through a passage to the engine, a plunger for controlling flow, a lever connected to the plunger and controlled by a mechanical mechanism responsive to at least two parameters related to engine conditions.

---

Figure 1:
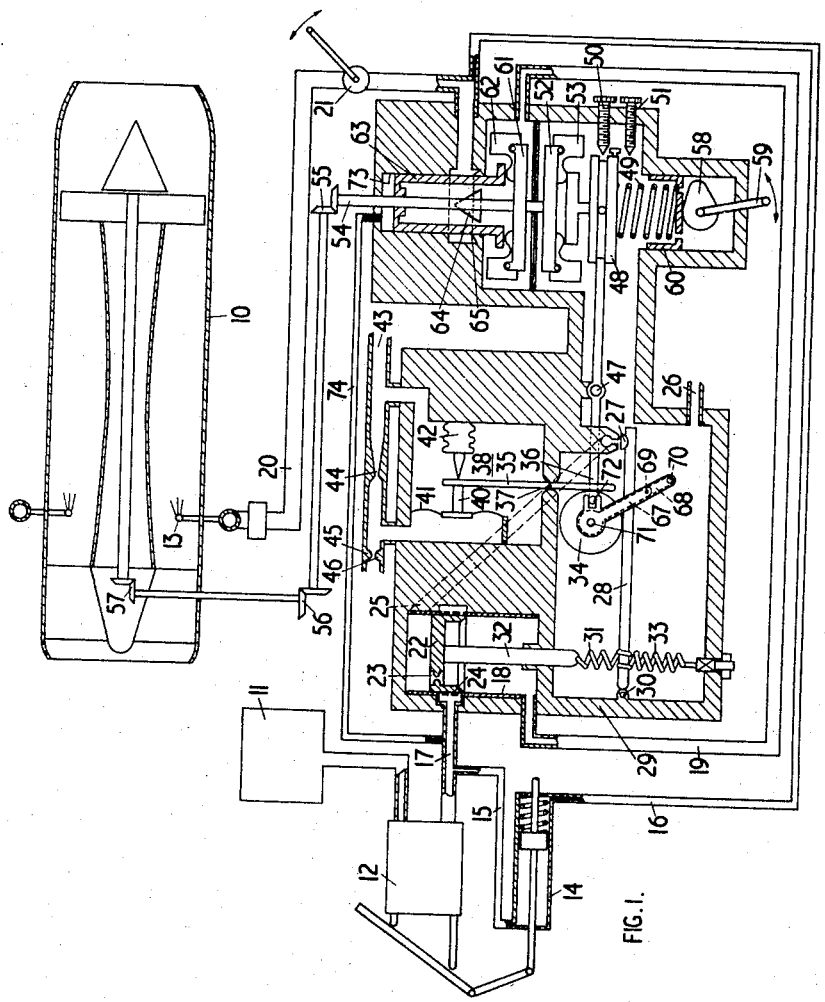

This invention relates to fuel systems for supplying fuel to gas turbine engines, such a system being under manual control and being arranged to maintain a set engine speed despite changes in certain functions such as, for example, pressures obtaining in various regions in the engines and engine speed fluctuations.

The object of the invention is to provide a fuel system of the type referred to in a convenient and effective form.

In accordance with the present invention a fuel system for a gas turbine engine comprises a fuel supply pump, a passage through which fuel can flow between the pump and an engine with which the system is associated, a plunger, the position of which determines the rate of flow of fuel through the passage, a lever connected to the plunger to impart movement thereto, and a mechanical mechanism engageable with the lever and being responsive to changes in at least two parameters related to engine conditions to cause movement of the lever.

The invention will now be described by way of example, with reference to the accompanying drawings in which:

FIGURE 1 is a diagrammatic representation of a fuel system in accordance with the present invention and FIGURE 2 is a perspective view of a mechanical mechanism forming part of the system in FIGURE 1.

The system shown is for use in supplying liquid fuel to a gas turbine engine 10 and is provided with a reservoir 11 for storing fuel which can be delivered by a pump 12 to burners 13 in the engine. The pump 12 is of the swash plate type and the stroke is controlled by a servo mechanism 14 which is itself influenced by the pressure at the outlet of the pump 12, in a pipe 15 and also by the pressure of fuel downstream of a speed responsive control, to be more fully described, this pressure being exerted on the servo mechanism 14 through a pipe 16. Fuel flow to the burners 13 in use, normally takes place through a passage formed by an outlet pipe 17 from the pump 12, a cylinder 18, a pipe 19 leading to the speed responsive device and a pipe 20 leading from the speed responsive device to the burners 13 in the engine 10. The pipe 20 incorporates a stop valve 21 for manually shutting off the supply of fuel to the engine.

The cylinder 18 contains a plunger 22 having a restricted orifice 23, the plunger position determining the rate of flow of fuel from the pipe 17 into the cylinder 18, and thence to the pipe 19. The cylinder wall for this purpose has a plurality of orifices 24 or a shaped opening, a change in flow through the orifices 24 caused by movement of the plunger being proportional to the magnitude of that movement.

The position of the plunger 22 is maintained by fuel pressure above and below it (as seen in the drawing) there being maintained a pressure above it through the restricted orifice 23 in the plunger 22 and this fuel can escape through a passage 25 under the control of a valve 27 and thence through an outlet pipe 26 to the pump inlet or the reservoir 11 in the system. The rate of flow through the restricted orifice 23 is dependent upon the pressure difference across the plunger 22 which is dependent in turn upon the position of the plunger 22 in the cylinder 18.

The valve 27 is a half ball carried at one end of a lever 28, the opposite end of which is pivoted at 30 to a suitable structure 29 in which the cylinder 18 is formed. Near the first position 30 the lever 28 has connected to it a tension spring 31 the other end of which is connected to a rod 32 on the plunger 22.

A further spring 33 connected at the same position to the lever 28 is adjustable to determine the force which the spring 31 can exert upon the plunger 22.

Near the end of the lever 28 carrying the half ball of the valve 27 there is disposed a mechanical mechanism illustrated in FIGURE 2 and to be more fully described, this mechanism having a roller 34 bearing against the lever 28. The mechanism is capable of being actuated by a lever 35 or by an arm 36 to cause movement of the lever 28 and thus to cause movement of the plunger 22 to control the flow rate of fuel through the passage to the engine. Movement of the lever 28 changes the opening of the valve 27, which in turn enables a new equilibrium position for the plunger 22 to be established with a new pressure difference value across the plunger 22.

Actuation of the lever 35, which is pivoted in the structure 29 at 37 so that its end remote from the roller 34 extends into a chamber 38 in the structure 29, is by means which are responsive to changes in the pressure difference between the air pressures upstream and downstream respectively of the engine compressor. The lever 35 is connected by a rod 40 to the centre of a diaphragm 41 and also to an evacuated bellows 42 within the chamber 38. This chamber 38 is subjected to the air pressure upstream of the engine compressor through the pipe 43 and the portion of the chamber 38 which is enclosed by the diaphragm 41 is subjected to a function of the pressures upstream and downstream of the compressor, this function being obtained by an air potentiometer formed by a pair of restrictors 44, 45, the former being in the pipe 43 and the latter being in a pipe 46 subjected to the compressor downstream pressure. Changes in these pressures then vary the position of the lever 35 which, in turn acts upon the roller 34 to alter the position of the lever 28 in a manner to be described.

A second parameter for determining the position of lever 28 and thus the fuel flow to the engine is determined by engine speed. This is applied to the mechanism re 34 through the arm 36 pivoted on the structure 29 at an extension of this arm 36 at the other side of the pivot 47 engaging a member 48. The member 48 is influenced by a spring 49 and its permitted travel is determined by two stops 50, 51 in the structure 29.

The member 48 is acted upon by weights 53 mounted upon a carrier 52 which is driven by the engine 10 as a function of its speed through a shaft 54. The shaft is driven by the engine through gearing indicated at 5 and 57.

Engine speed thus controls the position of the arm and this actuates the mechanism to control the position of the lever 28. The action of the weights 53 upon member 48 is controlled by the spring 49 which engages a cup-shaped member 60 which in turn bears against a cam 58 which is connected to a lever 59, the latter under the control of the pilot.

To the shaft 54 is also connected a second carrier with weights 62 which are lighter than the weights which are arranged to act upon a sleeve 63 in which is formed a triangular or other shaped orifice 64 through which fuel must pass between the pipe 19 and the pipe 20. This device is thus also speed responsive and the engine speed determines the position of the sleeve 63 and thus the area of the triangular orifice 64 which is exposed for the flow of fuel, the orifice being arranged to be partially blanked off by a metering edge 65 in the structure 29 in which the sleeve 63 is axially slidable. The sleeve 63 is mounted in a cylinder 73 the end of which remote from the weights 62 is in communication through a pipe 74 with the pump outlet pipe 17. There is thus applied to the sleeve 63 a pressure acting in opposition to a force, the value of which is determined by engine speed, applied by the weights 62. Any out of balance of these forces moves the sleeve 63 to control the quantity of fuel to the engine through the orifices 64. Any change in the flow of fuel through the orifice 64 results in a change in pressure in the pipe 20 and thus in the pipe 16 which communicates with the servo mechanism 14 for varying the pump stroke and hence fuel supply to the engine. In this manner the pressure drop across the orifices 24 is maintained at a value determined by engine speed.

Referring now to the form of the mechanical mechanism, this is shown in FIGURE 2 and comprises the roller 34 against which the lever 28 bears, the lever 35 also bearing against it at right angles to the line action of the lever 28. The roller 34 is a multiple one and is suspended for rotation on an axle 66 which, in turn is carried by a pair of arms 67 which, at their opposite ends are connected to a second pair of arms 68 through coaxial shafts 69. The second pair of arms 68 are joined by a bar 70 and are connected to coaxial shafts 71 rotatably mounted in the relatively fixed structure 29. The axle 66 can swing about an arc with its centre on the common axis of the shafts 69, this arc at one point being coincident with the common axis of the shafts 71, this position being shown.

As seen in FIGURE 1, the mechanism is slightly different but similar parts having been indicated by like numerals and furthermore it will be seen that one of the arms 8 has forks 72 in which the end of the arm 36 engages. Thus in use, the position of the roller 34 can be altered by movement of the lever 35, and the arm 36 can rotate the mechanism about the shafts 71. When the mechanism is in the position illustrated, the movement of the arm 36 has no effect upon the lever 28 but in any other position, the roller 34 is moved and there is a consequential movement of the lever 28 thus altering the fuel flow rate to the engine.

It is to be understood that other forms of mechanical mechanism performing the same function can be utilised.

Having thus described my invention what I claim as new and desire to secure by Letters Patent is:

1. A fuel system for a gas turbine engine comprising a fuel supply pump, a passage through which fuel can flow between the pump and an engine with which the system is associated, a plunger, the position of which determines the rate of flow of fuel through the passage, a lever connected to the plunger to impart movement thereto, and a mechanical mechanism engageable by the lever, the mechanical mechanism comprising a first part connected for angular movement about an axis to means responsive to changes in one parameter related to engine conditions, a further part connected to the first part for angular movement relatively to the first part about an axis off-set, but parallel, to that about which the first part is movable, a further lever connected to means responsive to changes in another parameter related to engine conditions, said further lever acting in one direction on said further part, and said lever connected to the plunger engaging with the further part of the mechanism in a direction transverse with respect to the direction of action of the further lever on said further part.

References Cited

UNITED STATES PATENTS

| 2,668,415 | 2/1954 | Lawrence | 60—39.28 |
| 3,002,348 | 10/1961 | Haase | 60—39.28 |
| 3,142,259 | 7/1964 | Tyler | 60—39.28 |
| 3,330,109 | 7/1967 | Carras et al. | 60—39.28 XR |

JULIUS E. WEST, *Primary Examiner.*

74—479          U.S. Cl. X.R.